Inventor
Frederick John O'Hanlon
By Morrison, Kennedy & Campbell
Attorneys

United States Patent Office 3,508,313
Patented Apr. 28, 1970

1

3,508,313
HANDLING OF TUBULAR MEMBERS MADE,
FOR EXAMPLE, OF GLASS
Frederick John O'Hanlon, Widnes, England, assignor to
Pilkington Brothers Limited, Liverpool, Lancashire,
England, a corporation of Great Britain
Filed Apr. 10, 1967, Ser. No. 629,493
Claims priority, application Great Britain, May 11, 1966,
20,959/66
Int. Cl. B23p 19/04, 19/02; B23n 17/00
U.S. Cl. 29—200                                    4 Claims

ABSTRACT OF THE DISCLOSURE

A tubular member having one centrally apertured end wall, for example a cylindrical glass syringe blank, is supported on a bolster of corresponding cross section, with its end wall in juxtaposition to the end wall of the bolster, and gas under pressure is directed through the aperture in the end wall thereby causing continuous displacement of the tubular member from the bolster which displacement is permitted by retraction of the gas source as to the tubular member is displaced.

BACKGROUND OF THE INVENTION

Field of the invention

This invention relates to the processing of tubular members and more especially to a method of and apparatus for separating a tubular member, having one end wall, from a bolster of corresponding cross-sectional form on which bolster the tubular member is supported for processing, with the end walls of the tubular member and the bolster is juxtaposition, the tubular member having a centrally apertured area in the end wall thereof.

Description of the prior art

In many processes a tubular member is supported in such manner on a bolster, and after processing it is necessary to remove the tubular member from the bolster. Removal of the tubular member from a close fitting bolster by conventional means, such as by hand or by mechanical means, rarely results in a concentric removal of the tubular member and thus the bore of the tubular member can be marred by the bolster, whilst mechanical removal means can mar the external surface of the tubular member. This problem is of particular importance when the tubular member is to be manufactured to fine limits and/or when the tubular member is in a condition where it can be readily marred or deformed, e.g. when the tubular member is of glass and is in a plastic condition.

In, for example, the manufacture of a glass syringe body by conventional means a glass tube is passed over a bolster and located so that one end of the tube extends beyond an end wall of the bolster. The glass tube is then heated and that portion of the tube extending beyond the end wall of the bolster is deflected to form an end wall to the tube, with a nozzle extending from the end wall in axial alignment with the tube. The working of the end of the glass tube is carried out in such a way that a nozzle aperture, extending between the interior of the tube and atmosphere, passes axially through the nozzle, and thus the end wall of the tubular member has a centrally apertured area, that is to say an aperture surrounded by an imperforate area of the end wall.

The glass tube is necessarily a close fit on the bolster and the operation is completed with at least the end part of the glass tube in a hot, plastic state. It is uneconomical, and in fact undesirable, to retain the formed tubular member on the bolster until the member is cold, and removal must thereby be effected from a close fitting bolster whilst the glass is in a heated condition.

In practice, formed tubular members are commonly removed by hand, but this often results in surface damage to the bore of the tubular member because a concentric extraction cannot always be obtained by hand. When mechanical removal means are provided there are serious difficulties in locating the said removal means for concentric removal of the tubular member and the mechanical surfaces engageable with the heated glass can damage the tubular member as described above.

An object of the present invention is to provide a method of and apparatus for separating a tubular member from a bolster on which it is supported as hereinbefore described, in which the outer surface of the tubular member is not gripped by any solid means.

SUMMARY

According to the present invention, a method of separating a tubular member, having one end wall, from a bolster of corresponding cross-sectional form on which bolster the tubular member is supported for processing, with the end walls of the tubular member and the bolster in juxtaposition, the tubular member having a centrally apertured area in the end wall thereof, is characterised in that gas under pressure is directed from an external source through the apertured area of the ned wall at the juxtaposed end wall of the supporting bolster, and expanded between the juxtaposed end walls, thereby creating a resultant force, acting on the imperforate area of the inside of the end wall of the tubular member, and capable of displacing the tubular member from the bolster, and the external source of compressed gas is retracted to allow the displacement of the tubular member to continue until the tubular member is separated from the bolster.

One particularly advantageous method according to the present invention is characterised in that gas under pressure is directed from the external source on to the end wall of the tubular member so that one part of the directed compressed gas passes through the apertured area on to the end face of the bolster and is expanded between the two juxtaposed end walls, thereby creating a resultant force, acting on the imperforate area of the inside of the end wall of the tubular member, capable of displacing the tubular member from the bolster, and the rest of the directed compressed gas is diffused at the source and strikes the imperforate area of the outside of the end wall of the tubular member so that the resultant force is continually opposed by the force of the gas striking the imperforate area of the outside of the end wall as the tubular member is displaced. Thus the tubular member is separated from the bolster without even touching any solid means.

The present invention further provides apparatus for separating a tubular member, having one end wall, from a bolster of corresponding cross-sectional form on which bolster the tubular member is supported for processing, with the end walls of the tubular member and the bolster in juxtaposition, the tubular member having a centrally apertured area in the end wall thereof, comprising an external source of gas under pressure, means for supporting the external source facing towards the end or the bolster, connection means for connecting the source to a supply of gas under pressure, and retracting means connected to the support and operable to move the support, and the source, away from the bolster.

Where the compressed gas is to be diffused at the source, so as to provide an opposing force exerted by the diffused gas on the outside of the end wall of the tubular member, the external source of compressed gas according to the present invention has a divergent outlet.

DESCRIPTION OF THE PREFERRED EMBODIMENT

Figure 1:
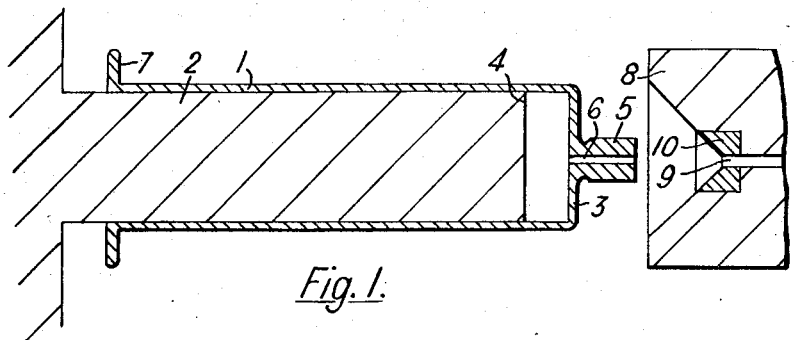
FIGURE 1 shows a longitudinal section through a cylindrical glass syringe blank supported on a bolster of corresponding cross-sectional form, with the end walls of the tubular member and the bolster in juxtaposition, and a gas source facing towards the end of the bolster, in accordance with the invention.

FIGURE 1 shows a cylindrical glass syringe blank 1 supported on a cylindrical bolster 2 with an end wall 3 of the blank 1 juxtaposed to an end wall 4 of the bolster 2, this being the position in which the blank is supported following a nozzle forming operation or a blank sizing operation.

The syringe blank 1 has a nozzle 5 extending axially from the end wall 3 and an aperture 6 passes through the nozzle 5 from the interior of the syringe blank to atmosphere. A flange 7 extends radially outwards from the open end of the blank 1.

In FIGURE 1, the aperture 6 is on the axis of the syringe blank 1, but in some forms of blank the aperture and the nozzle 5, are off the axis. In order to utilise a method according to the present invention it is necessary only for the end wall 3 of the blank to have a centrally apertured area, that is to say the aperture should be surrounded by an imperforate area of the inside of the end wall 3.

Separation is effected by means of a gas source 8, external of the tubular member 1 and arranged in axial alignment with the nozzle 5 and having a bore 9 therethrough opening into a conical resilient element 10.

Figure 2:
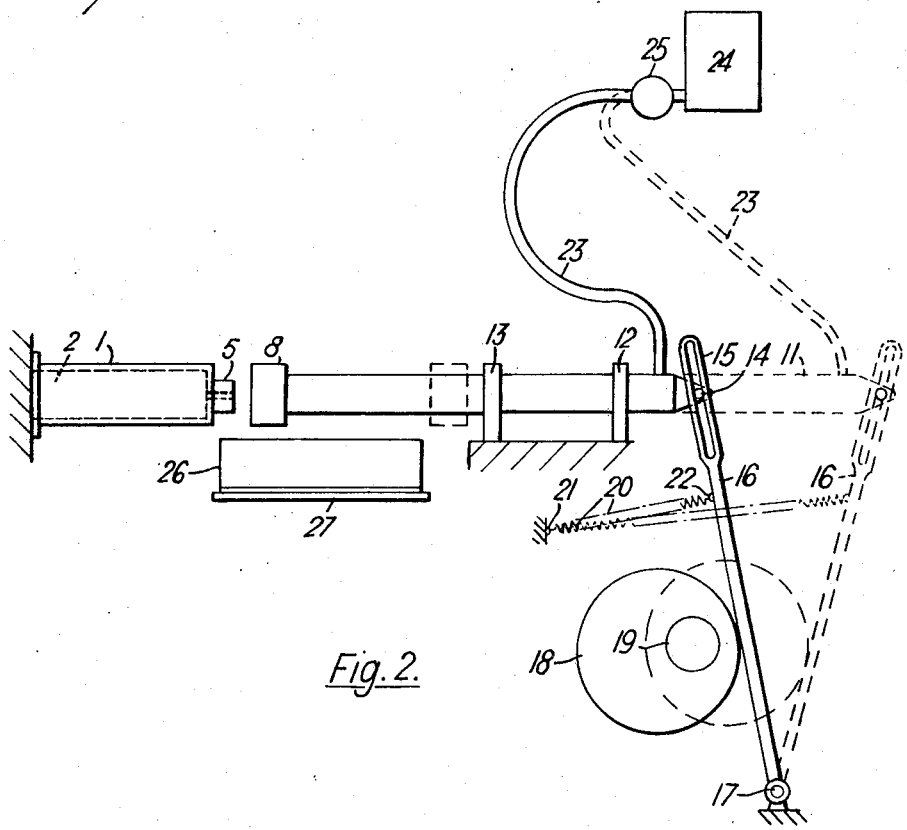
FIGURE 2 shows a side view of apparatus for advancing and retracting a gas source as shown in FIGURE 1 axially relative to the bolster.

Referring to FIGURE 2, the external gas source 8 is mounted on one end of a tube 11 with the bore 9 open to the bore of tube 11, and tube 11 is slidably supported in bearings 12 and 13 to allow displacement of the external source 8 along a path parallel to the axis of bolster 2.

The rear end (right hand side as viewed in FIGURE 2) of tube 11 is sealed and is provided with a pin 14 slidably located in a slot 15 of a cam follower 16. Cam follower 16 is retained by a pivotal connection 17 to a fixed point and is held in contact with the periphery of an eccentric 18 mounted on a shaft 19 by a tension spring 20 which extends between a fixed anchoring 21 and an anchoring 22 secured to cam follower 16.

A flexible tube 23 connects the bore of tube 11 with a supply of pressurised gas generally indicated by numeral 24, and the supply of gas through conduit 23 can be shut off when the apparatus is not in use by a valve 25.

In operation the syringe blank 1 is separated from the bolster 2 by rotating shaft 19 and eccentric 18 from the position shown in broken lines to the position shown in full lines to allow displacement of cam follower 16 anti-clockwise under the tension of spring 20 and thereby to displace tube 11 until the external gas source 8 lies close to the nozzle 5 of the blank 1. The valve 25 is open to allow gas under pressure to flow from supply 24, down conduit 25, into the bore of tube 11 and thus to be released through the external source 8.

In this position pressurised gas is directed from source 8 through the aperture 6 in the end wall 3 of the blank 1, and thus at the juxtaposed end wall 4 of the bolster 2, and expands between the juxtaposed end walls 3 and 4 thereby creating a resultant gaseous force acting on the imperforate area of the inside of the end wall 3 of the blank 1 capable of displacing the blank 1 from the bolster 2, so that the end wall 3 is displaced away from the end wall 4 of bolster 2.

Substantially the whole of the gas emanating from the source 8 enters the aperture 6, so that the resultant force acting on the inside of the end wall 3 of the syringe body 1 always exceeds any slight external gaseous force acting on the end wall 3 and therefore the blank 1 is displaced along the bolster 2 until the nozzle 5 engages with the resilient element 10. As the external source 8 is displaced to allow the tubular member 1 to be displaced off the bolster 2, the nozzle 5 is maintained in engagement with the resilient ring 10 by the resultant force derived from the continuous expansion of the gas entering the space between the end walls 3 and 4 through the aperture 6, and acting on the inside of the end wall 3.

Shaft 19 and eccentric 18 continue to rotate so that cam follower 16 is displaced clockwise towards the position shown in broken lines in FIGURE 2 and during this displacement tube 11 and external source 8 move towards the right to allow the displacement of the syringe blank 1 to continue until the open end of blank 1 is free from bolster 2 and the blank 1 can fall, under gravity, on to a padded slide 26 and thus on to a removal means such as a conveyor 27.

As the end wall 3 of the blank 1 moves away from end wall 4 of the bolster 2 the volume of the space between the juxtaposed walls 3 and 4 will increase and the gas between wall 3 and the wall 4 would suffer a pressure drop. Further, a little gas will escape from the space between the end walls 3 and 4 by passing between bolster 2 and the syringe blank 1, but this loss of gas is not detrimental to the separation of the syringe blank from the bolster and in fact the escaping gas cools the bolster, which has a coefficient of expansion many times greater than the glass, and assists in reducing the friction force between the syringe blank 1 and the bolster 2. The escaping gas thus reduces the force required to displace the blank 1 from bolster 2 and also assists in preventing marring of the bore of blank 1.

The gas flowing through nozzle aperture 6 must therefore be sufficient to replace the gas lost from the space between the end wall 4 of bolster 2 and end wall 3 of the blank 1 and must also maintain the required pressure in said space to retain the resultant force required for displacement.

Figure 3:
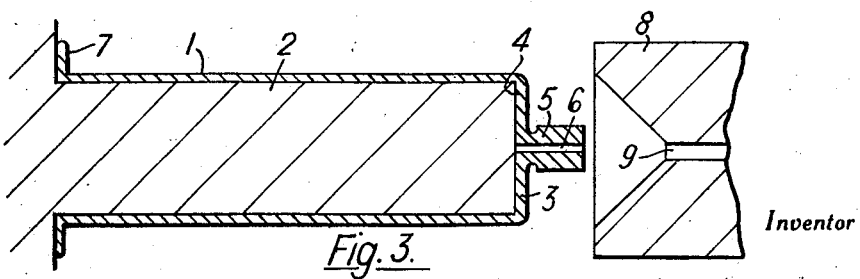
FIGURE 3 is a longitudinal section similar to FIGURE 1, but showing a modified form of gas source in accordance with the invention.

FIGURE 3 shows an alternative form of external gas source 8, the use of which entirely avoids contact of any solid means with the outside of the syringe blank 1. In FIGURE 3, the bore 9 is larger than in FIGURE 1 so that one part of the compressed gas enters through the aperture 6 and the rest is diffused at the source by means of the conical outlet 27 of which the rim is a little smaller than the end wall of the syringe blank 1.

Consider now the effect of the gasses on the syringe blank during the separation operation using the gas source shown in FIGURE 3.

In the extreme left hand position the external gas source 8 lies very close to the syringe blank 1 and the rim of the conical outlet of the source 8 lies close to the periphery of the end wall 3 of the syringe blank 1 so that the gas diffused from the source strikes the imperforate area of the outside of end wall 3 and the escape of gas from between the said source 8 and end wall 3 is restricted.

Thus the gas pressure on the outside of end wall 3 increases and creates a force tending to push end wall 3 against the end wall 4 of the bolster.

At this stage the gas flowing through nozzle aperture 6 and expanding between juxtaposed end walls 3 and 4 will not leak away between blank 1 and bolster 2 to a substantial extent because of the length of the escape path, which is then at its maximum.

As gas source 8 is retracted towards the right the first effect is to increase the distance between the periphery of end wall 3 and the rim of the conical outlet of the source 8 so that gas can readily escape from the space therebetween and the gas pressure acting on the external surface of end wall 3 is reduced sufficiently for the gas flowing through aperture 6 to develop a resultant force acting on the inside of the end wall 3 of the syringe blank to force end wall 3 away from the end wall 4 of the bolster.

It will be apparent from the above that when the end wall 3 of the syringe blank 1 approaches the source 8 the force acting on the outside of the end wall 3 is increased sufficiently to avoid contact between the gas source 8 and any part of the syringe blank 1, and this balancing of the opposed gaseous forces on the end wall 3 continues throughout the whole separation operation.

It will be appreciated that when using the external source as shown in FIGURE 1, the nozzle end of the syringe blank is continually supported by the conical resilient element 10, thereby maintaining the tubular body coaxially on the bolster, whereas no such end support is provided when using the external source as shown in FIGURE 3. It has been found that the FIGURE 1 arrangement should be used where there is a possibility (e.g. when separating a long tubular member from the bolster) of the tendency of gravity to tilt the tubular member causing it to bind on the bolster during the latter par of the separation, to an extent which could otherwise cause undesirable marring of the inside of the tubular member.

I claim:

1. A method of separating a tubular member, having one end wall, from a bolster of corresponding cross-sectional form on which bolster the tubular member is supported for processing, with the end walls of the tubular member and the bolster in juxtaposition, the tubular member having a centrally apertured area in the end wall thereof, characterized by the steps of directing gas under pressure from an external source through the apertured area of the end wall at the juxtaposd end wall of the supporting bolster, the gas expanding between the juxtaposed end walls, thereby creating a resultant force, acting on the imperforate area of the inside of the end wall of the tubular member, and capable of displacing the tubular member from the bolster, and retracting the external source of compressed gas to allow the displacement of the tubular member to continue until the tubular member is separated from the bolster.

2. A method according to claim 1, characterised by directing gas under pressure from the external source on to the end wall of the tubular member so that one part of the directed compressed gas passes through the apertured area on to the end face of the bolster and expands between the two juxtaposed end walls, thereby creating a resultant force, acting on the imperforate area of the inside of the end wall of the tubular member, capable of displacing the tubular member from the bolster, and the rest of the directed compressed gas is diffused at the source and strikes the imperforate area of the outside of the end wall of the tubular member so that the resultant force is continually opposed by the force of the gas striking the imperforate area of the outside of the end wall as the tubular member is displaced.

3. Apparatus for separating a tubular member having one end wall from a bolster of corresponding cross-sectional form, on which bolster the tubular member is supported for processing, with the end walls of the tubular member and the bolster in juxtaposition, the tubular member having a centrally apertured area in the end wall thereof, characterised by an external source of gas under pressure, means for supporting the external source facing towards the end of the bolster, connection means for connecting the source to a supply of gas under pressure, and retracting means connected to the support and operable to move the support, and the source, away from the bolster.

4. Apparatus according to claim 3, in which the source of compressed gas is shaped to engage the end of the tubular member.

References Cited

UNITED STATES PATENTS

| | | | |
|---|---|---|---|
| 2,748,461 | 6/1956 | Ohlsson | 29—421 |
| 2,817,142 | 12/1957 | Boden et al. | 29—234 |
| 3,137,060 | 6/1964 | Granzer et al. | |
| 3,267,568 | 8/1966 | Johnson et al. | 29—427 X |

THOMAS H. EAGER, Primary Examiner

U.S. Cl. X.R.

29—234, 421, 427